(12) United States Patent
Yamazaki et al.

(10) Patent No.: US 12,057,766 B2
(45) Date of Patent: Aug. 6, 2024

(54) CONTROL UNIT

(71) Applicant: IKS Co., Ltd., Kyoto (JP)

(72) Inventors: Takamasa Yamazaki, Tokyo (JP);
Kouichi Hiraoka, Tokyo (JP);
Kazuhito Sasaki, Tokyo (JP); Makoto Miyata, Tokyo (JP); Takashi Imai, Kyoto (JP); Hideaki Abumi, Kyoto (JP); Takao Goto, Kyoto (JP)

(73) Assignee: IKS Co., Ltd., Kyoto (JP)

( * ) Notice: Subject to any disclaimer, the term of this patent is extended or adjusted under 35 U.S.C. 154(b) by 175 days.

(21) Appl. No.: 17/911,549

(22) PCT Filed: Mar. 17, 2020

(86) PCT No.: PCT/JP2020/011688
§ 371 (c)(1),
(2) Date: Sep. 14, 2022

(87) PCT Pub. No.: WO2021/186540
PCT Pub. Date: Sep. 23, 2021

(65) Prior Publication Data
US 2023/0179083 A1     Jun. 8, 2023

(51) Int. Cl.
*H02M 1/08*     (2006.01)
(52) U.S. Cl.
CPC .................... *H02M 1/083* (2013.01)
(58) Field of Classification Search
CPC ...... H02M 1/08; H02M 1/083; H02M 1/0009; H02M 7/48
See application file for complete search history.

(56) References Cited

U.S. PATENT DOCUMENTS 9,285,410 B2 *  3/2016  Inoguchi ............... G01R 29/18
9,941,810 B2 *  4/2018  Arisawa ................. H02M 7/06
(Continued)

FOREIGN PATENT DOCUMENTS

| CN | 202353218 U | 7/2012 |
| JP | 2013-21792 A | 1/2013 |
| JP | 2016-010203 A | 1/2016 |

OTHER PUBLICATIONS

Extended European Search Report issued in EP counterpart application No. 20925892.0, dated Nov. 8, 2023, 11 pages.
(Continued)

*Primary Examiner* — Adolf D Berhane
(74) *Attorney, Agent, or Firm* — Procopio, Cory, Hargreaves & Savitch LLP

(57) ABSTRACT

A control unit is provided with a step-down unit which causes a system voltage of each phase of a system to step down, a voltage pulse signal generation unit which generates a voltage pulse signal of each phase that was stepped down by the step-down unit, a current pulse signal generation unit which generates a current pulse signal of each phase of the system, a zero crossing point detection unit which outputs time information of a zero crossing point of the system voltage and the system current of each phase based on the voltage pulse signal and the current pulse signal of each phase of the system, and an arithmetic unit which calculates, respectively, a value of active power and a value of reactive power of AC power output by the power conditioner to the system based on the time information of the zero crossing point of the system voltage and the system current of each phase of the system provided from the zero crossing point detection unit, and thereby controls the power conditioner.

4 Claims, 3 Drawing Sheets

(56) References Cited

U.S. PATENT DOCUMENTS 10,971,991 B2 * 4/2021 Kato ................ H02M 7/53871
2013/0009603 A1 1/2013 Okui

OTHER PUBLICATIONS

Wikipedia; "Power Factor", Feb. 25, 2020 (Feb. 25, 2020), XP093093475, Retrieved from the Internet: URL: https://en.wikipedia.org/w/index.php?title=Power_factor&oldid=942499019 [retrieved on Oct. 20, 2023] * pp. 1-4 *, cited in the EESR, 13 pages.
Patent Cooperation Treaty, International Search Report, Application No. PCT/JP2020/011688, dated May 18, 2020, in 5 pages.

* cited by examiner

CONTROL UNIT

TECHNICAL FIELD

The present invention relates to a control unit and can be suitably applied, for instance, to a control unit which controls the power factor of the output power of a power conditioner.

BACKGROUND ART

In recent years, electricity trading of converting the DC electrical energy obtained from a solar power generation system into three-phase AC power of an R phase, an S phase and a T phase based on a power conditioner, and selling electricity by outputting the converted AC power to a power system is being popularly practiced.

With this kind of electricity trading, the power factor of the AC power output from the power conditioner to the power system needs to be kept within a predetermined range prescribed in the grid interconnection code or converged to a fixed level. Here, the power conditioner needs to detect, with a high accuracy, the zero crossing point of the voltage and the current of an alternating waveform of the power system to which the AC power is output.

Conventionally, as detection methods for detecting the zero crossing point of an alternating waveform, there are, for example, a hardware architecture which detects the zero crossing point with hardware such as a circuit, and a software architecture which detects the zero crossing point with software by inputting the alternative waveform of the current/voltage to a computer.

Here, a hardware architecture has higher accuracy in comparison to a software architecture and, for instance, while a hardware architecture can detect the zero crossing point of an alternating waveform in an error range of 10 [μsec] or less, with a software architecture the error range will be 500 [μsec] when the data input cycle is 20 [kHz]. In other words, in the case of a software architecture, an error of 2.5[%] will arise when the frequency of the power system is, for example, 50 [Hz].

CITATION LIST

Patent Literature

[PTL 1] Japanese Unexamined Patent Application Publication No. 2013-021792

SUMMARY OF THE INVENTION

Problems to be Solved by the Invention

Meanwhile, the method of detecting the zero crossing point that may be used in a power conditioner differs depending on the country. Thus, for example, there was a problem in that a power conditioner that was manufactured for a country that approves the use of a software architecture as the method of detecting the zero crossing point of a power conditioner (that is, a power condition which detects the zero crossing point with a software architecture) could not be used in a country that requires the use of a hardware architecture as the method of detecting the zero crossing point of a power conditioner.

The present invention was devised in light of the foregoing problem, and an object of this invention is to propose a control unit which enables a power conditioner that detects the zero crossing point with a software architecture to be compliant with the grid interconnection code of a country that requires the use of a hardware architecture for detecting the zero crossing point.

Means to Solve the Problems

In order to achieve the foregoing object, the present invention provides a control unit which controls a power conditioner that converts DC power into AC power and outputs the AC power to a system, comprising: a step-down unit which causes a system voltage of each phase of the system to step down; a voltage pulse signal generation unit which generates a voltage pulse signal as a pulse signal of the system voltage of each of the phases that was stepped down by the step-down unit; a current pulse signal generation unit which generates a current pulse signal as a pulse signal of a system current of each of the phases of the system; a zero crossing point detection unit which outputs time information of a zero crossing point of the system voltage and the system current of each of the phases based on the voltage pulse signal and the current pulse signal of each of the phases of the system; and an arithmetic unit which calculates, respectively, a value of active power and a value of reactive power of the AC power output by the power conditioner to the system based on the time information of the zero crossing point of the system voltage and the system current of each of the phases of the system provided from the zero crossing point detection unit, and controls the power conditioner so that a value of the active power and a value of the reactive power of the AC power output by the power conditioner to the system respectively become the calculated values.

Advantageous Effects of the Invention

According to the present invention, even if the power conditioner is of a type which detects the zero crossing point of the system power with a software architecture, it is possible to cause such power conditioner to be compliant with the grid interconnection code of a country that requires the use of a hardware architecture for detecting the zero crossing point of the system power.

DESCRIPTION OF EMBODIMENTS

An embodiment of the present invention is now explained in detail with reference to the appended drawings.

(1) Configuration of Power Conditioner System According to this Embodiment

Figure 1:
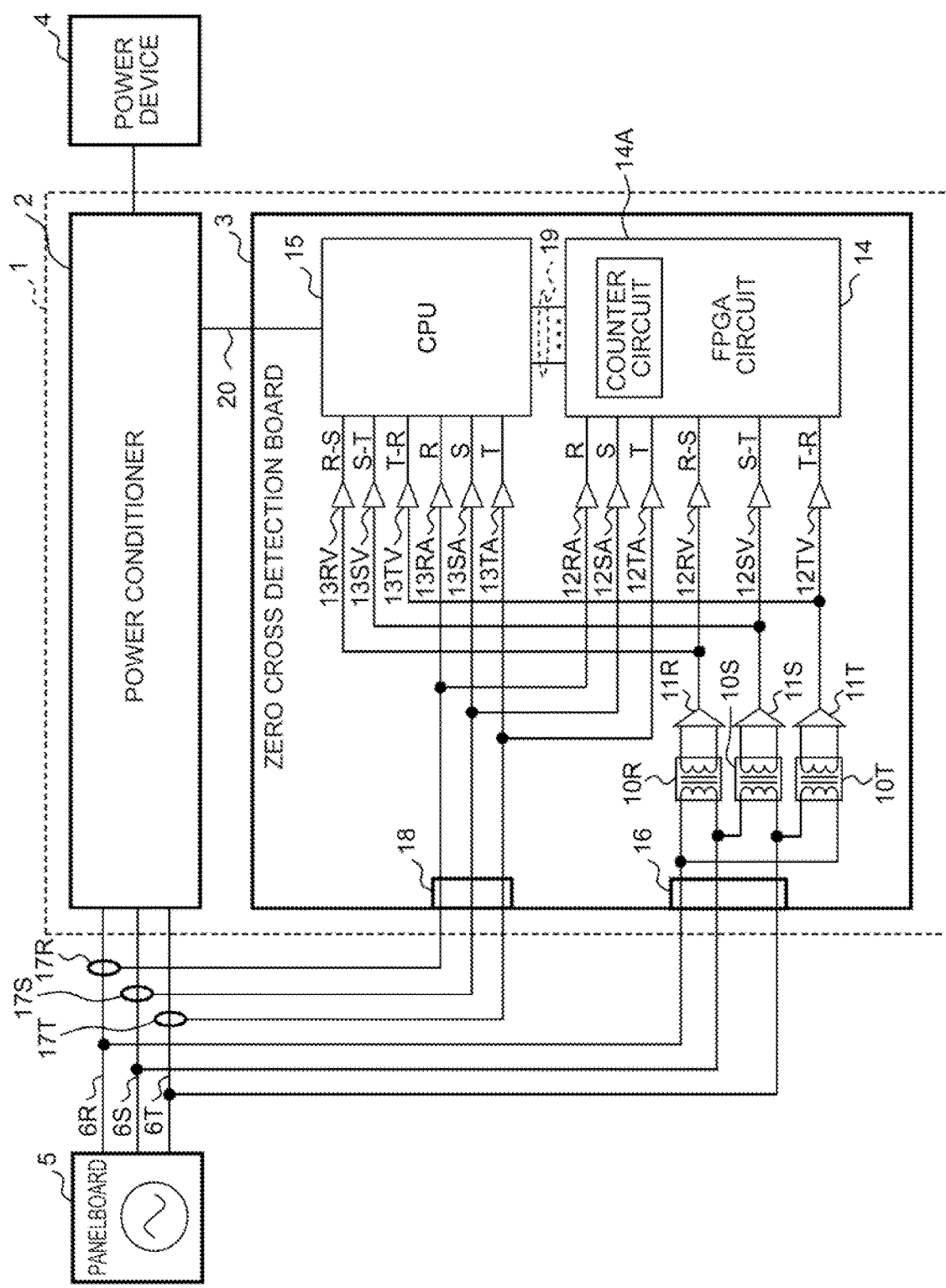
FIG. 1 is a block diagram showing the configuration of the power conditioner system according to this embodiment as a partial circuit configuration.

In FIG. 1, reference numeral 1 shows the overall power conditioner system according to this embodiment. The power conditioner system 1 is configured by a general purpose power conditioner 2, which detects a zero crossing point of a power system with a software architecture, being connected to a zero cross detection board 3.

The power conditioner 2 converts DC power output from a power device 4 such as a solar power generation system or secondary batteries respectively into AC power of an R phase, an S phase and a T phase, and outputs each AC power of the R phase, the S phase and the T phase obtained based on the foregoing conversion to each power line 6R, 6S, 6T (power system) of the R phase, the S phase or the T phase which connects the power conditioner 2 and a panelboard 5.

The zero cross detection board 3 is configured by comprising first to third pulse transformers 10R, 10S, 10T, first to third difference amplifiers 11R, 11S, 11T, first to third voltage comparators 12RV, 12SV, 12TV and first to third current comparators 12RA, 12SA, 12TA, first to third voltage operational amplifiers 13RV, 13SV, 13TV and first to third current operational amplifiers 13RA, 13SA, 13TA, an FPGA (Field-Programmable Gate Array) circuit 14 and a CPU (Central Processing Unit) 15.

Here, an alternating voltage of a power system of the R phase and the S phase (alternating voltage of the power system is hereinafter referred to as the "system voltage") is applied to the first pulse transformer 10R from each power line 6R, 6S of the R phase and the S phase via a connector 16. The first pulse transformer 10R steps down, respectively, the system voltages of the power systems of the R phase and the S phase to, for example, roughly 2 [V], and outputs the stepped down system voltages to the first difference amplifier 11R.

The first difference amplifier 11R amplifies the difference of the respectively stepped down system voltages of the R phase and the S phase, and outputs the result as an R-S system voltage to the first voltage comparator 12RV. Moreover, the first voltage comparator 12RV generates an R-S pulse signal that rises to a logical "1" level only during a period that the R-S system voltage is higher than 0 [V] by comparing the R-S system voltage and the earth voltage (0 [V]), and outputs the generated R-S pulse signal to the FPGA circuit 14.

Similarly, the system voltages of the S phase and the T phase are applied from each power line 6S, 6T of the S phase and the T phase to the second pulse transformer 10S via the connector 16. Subsequently, the second pulse transformer 10S respectively steps down the system voltages of the S phase and the T phase, for example, to roughly 2 [V], and outputs the result to the second difference amplifier 11S.

The second difference amplifier 11S amplifies the difference of the respectively stepped down system voltages of the S phase and the T phase, and outputs the result as an S-T system voltage to the second voltage comparator 12SV. Moreover, the second voltage comparator 12SV generates an S-T pulse signal that rises to a logical "1" level only during a period that the S-T system voltage is higher than 0 [V] by comparing the S-T system voltage and the earth voltage, and outputs the generated S-T pulse signal to the FPGA circuit 14.

Furthermore, the system voltages of the T phase and the R phase are applied from each power line 6T, 6R of the T phase and the R phase to the third pulse transformer 10T via the connector 16. Subsequently, the third pulse transformer 10T respectively steps down the system voltages of the T phase and the R phase, for example, to roughly 2 [V], and outputs the result to the third difference amplifier 11T.

The third difference amplifier 11T amplifies the difference of the respectively stepped down system voltages of the T phase and the R phase, and outputs the result as a T-R system voltage to the third voltage comparator 12TV. Moreover, the third voltage comparator 12TV generates a T-R pulse signal that rises to a logical "1" level only during a period that the T-R system voltage is higher than 0 [V] by comparing the T-R system voltage and the earth voltage, and outputs the generated T-R pulse signal to the FPGA circuit 14.

Here, an alternating current of the power system flowing through each power line 6R, 6S, 6T (this is hereinafter referred to as the "system current"), which was converted into a low voltage/small current by each of the current transformers (CT) 17R, 17S, 17T provided to each power line 6R, 6S, 6T of the R phase, the S phase and the T phase between the power conditioner 2 and the panelboard 5, is applied as an R phase transformation current, an S phase transformation current or a T phase transformation current to the first to third current comparators 12RA, 12SA, 12TA via the connector 18.

Subsequently, the first to third current comparators 12RA, 12SA, 12TA respectively generate an R phase system current pulse signal, an S phase system current pulse signal or a T phase system current pulse signal that rises to a logical "1" level only during a period that the R phase transformation current, the S phase transformation current or the T phase transformation current is higher than 0 [A] by comparing the applied R phase transformation current, S phase transformation current or T phase transformation current with 0 [A], and output the generated R phase system current pulse signal, S phase system current pulse signal or T phase system current pulse signal to the FPGA circuit 14.

The FPGA circuit 14 respectively converts the input R-S pulse signal, S-T pulse signal and T-R pulse signal, and the input R phase system current pulse signal, S phase system current pulse signal and T phase system current pulse signal, into time information, and outputs each piece of the obtained time information as an R-S time signal, an S-T time signal and a T-R time signal, and as an R phase system current time signal, an S phase system current time signal and a T phase system current time signal, to the CPU 15 via the address bus 19.

In effect, the FPGA circuit 14 comprises a counter circuit 14A which counts up the value at a cycle of 1 to several 10 [MHz] as the means for respectively converting the R-S pulse signal, the S-T pulse signal and the T-R pulse signal, and the R phase system current pulse signal, the S phase system current pulse signal and the T phase system current pulse signal, into time information.

Subsequently, the FPGA circuit 14 respectively monitors the signal waveforms of the R-S pulse signal, the S-T pulse signal and the T-R pulse signal respectively provided from the first to third voltage comparators 12RV, 12SV, 12TV, and acquires the counter value of the counter circuit 14A each time that the rising edge and the falling edge of the R-S pulse signal, the S-T pulse signal and the T-R pulse signal (each corresponding to the zero crossing point of the R phase, the S phase or the T phase of the system voltage) are detected. Moreover, the FPGA circuit 14 outputs the acquired count values to the CPU 15 via the address bus 19 as the foregoing R-S time signal, S-T time signal or T-R time signal.

Similarly, the FPGA circuit 14 respectively monitors the signal waveforms of the R phase system current pulse signal, the S phase system current pulse signal and the T phase system current pulse signal respectively provided from the first to third current comparators 12RA, 12SA, 12TA, and acquires the counter value of the counter circuit 14A each time that the rising edge and the falling edge of the R phase system current pulse signal, the S phase system current pulse signal and the T phase system current pulse signal (each corresponding to the zero crossing point of the R phase, the S phase or the T phase of the system current) are detected. Moreover, the FPGA circuit 14 outputs the acquired count values to the CPU 15 via the address bus 19 as the foregoing R phase system current time signal, S phase system current time signal or T phase system current time signal.

Figure 2:
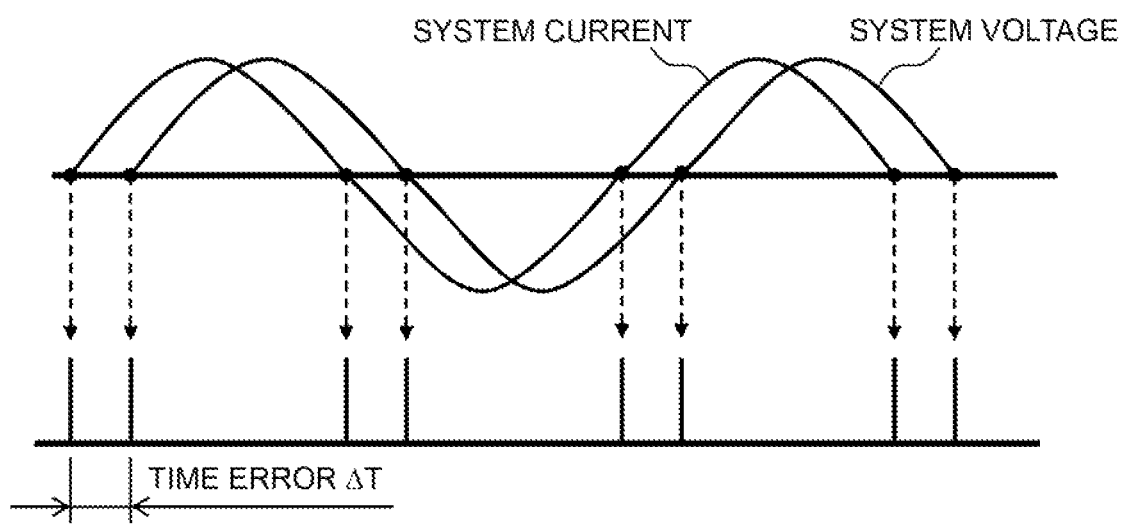
FIG. 2 is a diagram explaining the time error.

The CPU 15 calculates error time ΔT of the system voltage and the system current of the R phase as shown in FIG. 2 based on the counter values of the counter circuit 14A sequentially acquired at the zero-cross timing of the difference voltages of the system voltages of the R phase and the S phase, which are sequentially provided from the FPGA circuit 14 as the R-S time signal (this is hereinafter referred to as the "voltage zero cross count value"), and the count values of the counter circuit 14A sequentially acquired at the zero-cross timing of the system currents of the R phase, which are sequentially provided from the FPGA circuit 14 as the R phase system current time signal (this is hereinafter referred to as the "current zero cross count value"), and calculates the phase difference between the system voltage and the system current of the R phase based on the calculated error time ΔT.

Specifically, the CPU 15 calculates the error time ΔT between the system voltage and the system current of the R phase by multiplying the difference between the foregoing voltage zero cross count value and the corresponding current zero cross count value by the count up cycle of the counter circuit 14A. Moreover, the CPU 15 uses the calculated error time ΔT and calculates a phase difference $\theta_R$ between the system voltage and the system current of the R phase based on the following formula:

[Math 1]

$$\theta_R = (\text{error time} \div \text{cycle of 1 wavelength in power system}) \times 360° \quad (1)$$

Accordingly, for instance, when the frequency of the power system is 50 (Hz) and the error time was 1 [ms], the phase difference $\theta_R$ between the system voltage and the system current of the R phase at such point in time is calculated as being 18[°] as shown in the following formula:

[Math 2]

$$\theta_R = (1 \text{ ms} \div 20 \text{ ms}) \times 360° = 18° \quad (2)$$

Moreover, in the same manner, the CPU 15 calculates a phase difference $\theta_S$ between the system voltage and the system current of the S phase, and a phase difference $\theta_T$ between the system voltage and the system current of the T phase, respectively.

Furthermore, the CPU 15 respectively calculates the active power and the reactive power of the R phase, the S phase and the T phase to be respectively output by the power conditioner 2 to the power system (power line 6R, 6S, 6T) based on each measured value of the system voltage and the system current of the R phase, the S phase and the T phase measured in the manner described above, the phase differences $\theta_R$, $\theta_S$ and $\theta_T$ of the system voltage and the system current of the R phase, the S phase and the T phase calculated in the manner described above, and the set value of the apparent power prescribed in advance in the grid interconnection code (this is hereinafter referred to as the "set apparent power").

Specifically, the CPU 15 respectively calculates the active power for each of the R phase, the S phase and the T phase based on the following formula:

[Math 3]

$$\text{active power} = \text{set apparent power} \times \cos \theta \quad (3)$$

and respectively calculates the reactive power based on the following formula:

[Math 4]

$$\text{reactive power} = \text{set apparent power} \times \sin \theta \quad (4)$$

Note that, in Formula (3) and Formula (4), "set apparent power" is the value of the apparent power calculated from the power factor of the AC power output by the power conditioner 2 prescribed in the grid interconnection code, and "θ" is $\theta_R$ when seeking the active power of the R phase, is $\theta_S$ when seeking the active power of the S phase, and is $\theta_T$ when seeking the active power of the T phase.

Accordingly, for example, when the set apparent power is 6000 [VA] and the phase difference between the voltage and the current of a certain phase (R phase, S phase or T phase) is 18[°], the active power of that phase is calculated as 5706 [W] as shown in the following formula:

[Math 5]

$$\text{active power} = 6000 \times \cos 18° = 5706 \quad (5)$$

and the reactive power is calculated as 1854 [Var] as shown in the following formula:

[Math 6]

$$\text{reactive power} = 6000 \times \sin 18° = 1854 \quad (6)$$

Meanwhile, the R-S system voltage, the S-T system voltage and the T-R system voltage respectively output from the first to third difference amplifiers 11R, 11S, 11T are respectively provided to the CPU 15 via the first to third voltage operational amplifiers 13RV, 13SV, 13TV, and the foregoing R phase transformation current, S phase transformation current and T phase transformation current respectively output from each current transformer 17R, 17S, 17T are respectively provided to the CPU 15 via the first to third current operational amplifiers 13RA, 13SA, 13TA.

Subsequently, the CPU 15 respectively measures the voltage values of each system voltage of the R phase, the S phase and the T phase based on the R-S system voltage, the S-T system voltage and the T-R system voltage provided via the first to third voltage operational amplifiers 13RV, 13SV, 13TV, and respectively measures the current values of each system current of the R phase, the S phase and the T phase based on the R phase transformation current, the S phase transformation current and the T phase transformation current provided via the first to third current operational amplifiers 13RA, 13SA, 13TA.

Subsequently, when the values of the current active power and reactive power of the AC power output from the power conditioner 2 to the power system are not the values instructed to the power conditioner 2 but such values of the active power and the reactive power fall within the range prescribed in the grid interconnection code based on the voltage values of each system voltage of the R phase, the S phase and the T phase and the current values of each system current of the R phase, the S phase and the T phase obtained from the foregoing measurements, the CPU 15 sends the values of the active power and the reactive power for each R phase, S phase and T phase calculated in the manner described above to the power conditioner 2 via the communication path 20 as the target values of the new active power and reactive power of each phase.

Consequently, here, when the power conditioner 2 receives the active power command value and the reactive power command value from the zero cross detection board 3, the power conditioner 2 converts the output power of the power device 4 into the AC power of the R phase, the S phase and the T phase so that the values of the active power and the reactive power of the output power become the designated values, and respectively outputs these to the power lines 6R, 6S, 6T of the R phase, the S phase and the T phase.

(2) Power Conditioner Control Processing

Figure 3:
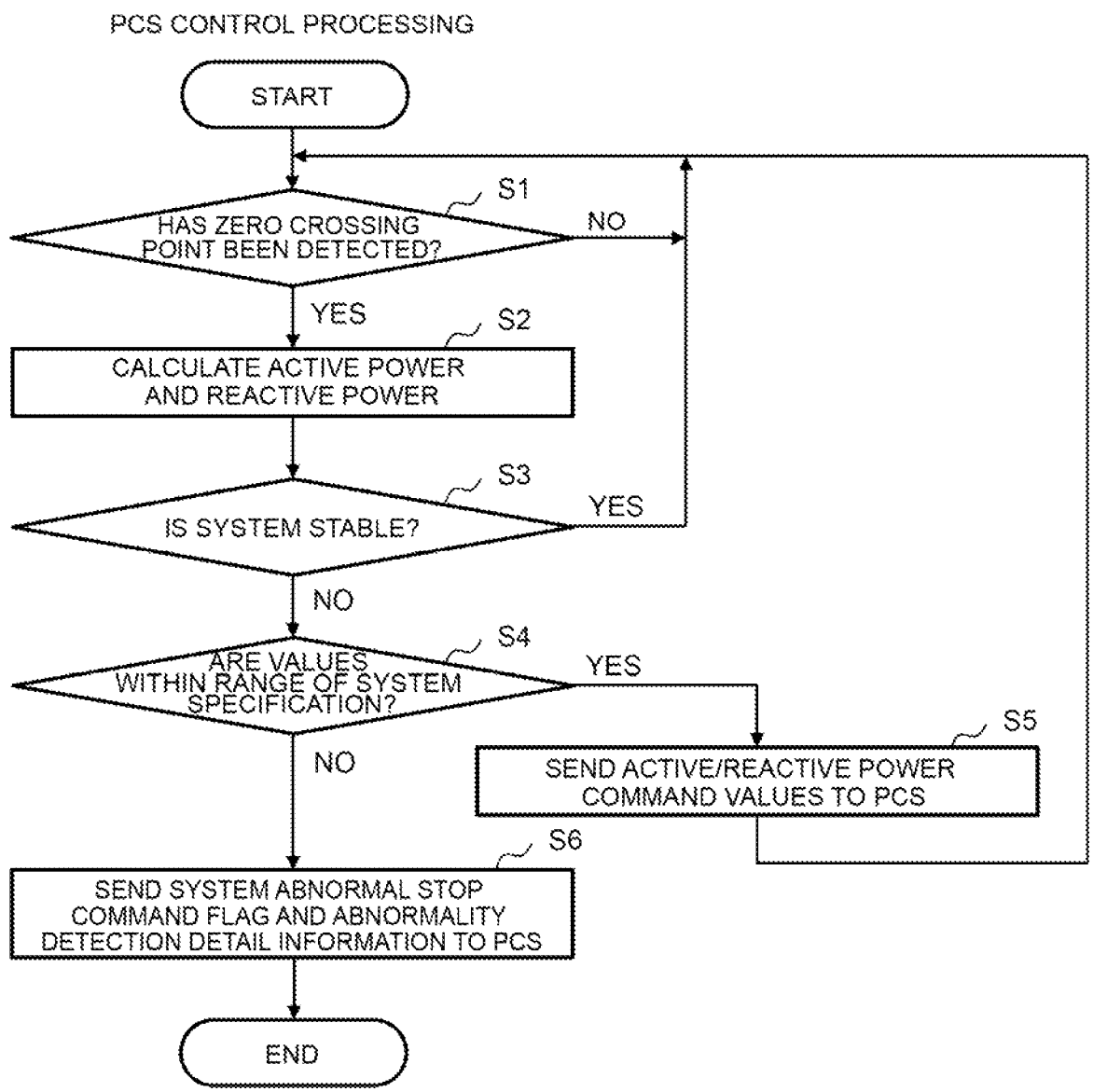
FIG. 3 is a flowchart showing the processing routine of the power conditioner control processing.

FIG. 3 is a flowchart showing the flow of the control processing of the power conditioner 2 based on the zero cross detection board 3 described above (this is hereinafter referred to as the "power conditioner control processing"). When the power is turned on, the power conditioner control processing shown in FIG. 3 is started in the zero cross detection board 3.

Subsequently, foremost, the FPGA circuit 14 respectively monitors the waveforms of the R-S pulse signal, the S-T pulse signal and the T-R pulse signal, and the waveforms of the R phase system current pulse signal, the S phase system current pulse signal and the T phase system current pulse signal, and waits for the detection of the rising edge and the falling edge in any of the waveforms (that is, the zero crossing point of the system voltage or the system current) (S1).

Subsequently, when the FPGA circuit 14 eventually detects the rising edge or the falling edge in any of the waveforms, it is converted into time information and notified to the CPU 15, and the CPU 15, based on this notice, calculates the target values of the active power and the reactive power of the AC power to be output from the power conditioner 2 by using Formula (1), Formula (3) and Formula (4) described above (S2).

Next, the CPU 15 respectively measures the storage values of each system voltage of the R phase, the S phase and the T phase based on the R-S system voltage, the S-T system voltage and the T-R system voltage provided via the first to third voltage operational amplifiers 13RV, 13SV, 13TV, and respectively measures the current values of each system current of the R phase, the S phase and the T phase based on the R phase transformation current, the S phase transformation current and the T phase transformation current provided via the first to third current operational amplifiers 13RA, 13SA, 13TA, and, based on the measurement results, determines whether the active power and the reactive power of the system power of the R phase, the S phase and the T phase are respectively the target values notified to the power conditioner 2 (S3).

Subsequently, when a positive result is obtained in the foregoing determination, the CPU 15 discards the values of the active power and the reactive power calculated in step S2 without sending them to the power conditioner 2. Consequently, in the foregoing case, the conversion of the DC power output from the power device 4 into the AC power of the R phase, the S phase and the T phase by the power conditioner 2 and the output thereof to the power system of the AC power are maintained and continued in their current state.

Meanwhile, when a negative result is obtained in the determination of step S3, the CPU 15 determines, based on the foregoing R-S system voltage, S-T system voltage and T-R system voltage, and the foregoing R phase transformation current, S phase transformation current and T phase transformation current, whether the values of the active power and the reactive power of the AC power output from the power conditioner 2 to the power system are within the range prescribed in the grid interconnection code (S4).

Subsequently, when a positive result is obtained in the foregoing determination, the CPU 15 respectively notifies the values of the active power and the reactive power calculated in step S2 to the power conditioner 2 via the communication path 20 (S5). Consequently, in the power conditioner 2, control is performed so that the active power value and the reactive power value of the AC power of the R phase, the S phase and the T phase output to the power system respectively become the values of the active power and the reactive power notified from the zero cross detection board 3.

Meanwhile, when a negative result is obtained in the determination of step S4, the CPU 15 sends, to the power conditioner 2, a system abnormal stop command flag to the effect of immediately stopping the operation (output of the AC power to the power system) and abnormality detection detail information describing the reason why the operation should be immediately stopped (S6). Consequently, the operation of the power conditioner 2 is stopped, and the abnormality detection detail information is sent to the higher-level controller (not shown). Here, the power conditioner control processing is ended.

(3) Effect of this Embodiment

As described above, with the power conditioner system of this embodiment, since the zero cross detection board detects the zero crossing point of the system power (system voltage and system current) with a hardware architecture, for example, even when the power conditioner is a type which detects the zero crossing point of the system power with a software architecture, it is possible to cause such power conditioner to be compliant with the grid interconnection code of a country that requires the use of a hardware architecture as the method for detecting the zero crossing point of the system power.

Moreover, as a result of using the zero cross detection board of this embodiment, since the manufacturer only needs to manufacture power conditioners of a type that uses a software architecture as the method for detecting the zero crossing point of the system power, the manufacturer can seek cost reduction in terms of the overall system based on the mass production of power conditioners.

Furthermore, even when the power conditioner is of a type which detects the zero crossing point of the system power with a software architecture, since it will be able to detect the zero crossing point of the system power more accurately than with a hardware architecture by being connected to the zero cross detection board according to this embodiment, control which accurately follows the system waveform is enabled, and the power factor of the AC power output from the power conditioner 2 to the power system can be more accurately approximate the value prescribed in the grid interconnection code.

(4) Other Embodiments

Note that, while the foregoing embodiment explained a case of applying a general purpose power conditioner which detects the zero crossing point of the power system with a software architecture as the power conditioner 2, the present invention is not limited thereto, and a power conditioner which detects the zero crossing point of the power system with a hardware architecture may also be applied as the power conditioner 2.

Moreover, while the foregoing embodiment explained a case of applying the pulse transformers 10R, 10S, 10T as the step-down unit for respectively stepping down the system voltage of each phase of the system, the present invention is not limited thereto, and various other electronics parts may also be broadly applied as the step-down unit.

Furthermore, while the foregoing embodiment explained a case of applying the first to third voltage comparators 12RV, 12SV, 12TV as the voltage pulse signal generation unit for generating the voltage pulse signals (R-S pulse signal, S-T pulse signal and R-T pulse signal) as the pulse signals of the system voltage of each phase stepped down by the pulse transformers 10R, 10S, 10T, the present invention is not limited thereto, and various other electronics parts may also be broadly applied as the voltage pulse signal generation unit for generating the voltage pulse signals.

Moreover, while the foregoing embodiment explained a case of applying the first to third current comparators 12RA, 12SA, 12TA as the current pulse signal generation unit for generating the current pulse signals (R phase system current pulse signal, S phase system current pulse signal or T phase system current pulse signal) as the pulse signals of the system current of each phase of the system, the present invention is not limited thereto, and various other electronics parts may also be broadly applied as the current pulse signal generation unit for generating the current pulse signals.

Furthermore, while the foregoing embodiment explained a case of applying the FPGA circuit 14 as the zero crossing point detection unit for outputting the time information of the zero crossing point of the system voltage and the system current of each phase based on the voltage pulse signals (R-S pulse signal, S-T pulse signal and R-T pulse signal) and the current pulse signals (R phase system current pulse signal, S phase system current pulse signal or T phase system current pulse signal) of each phase of the system, the present invention is not limited thereto, and various other electronics parts may also be broadly applied as the zero crossing point detection unit.

Moreover, while the foregoing embodiment explained a case of applying the CPU 15 as the arithmetic unit for controlling the power conditioner 2 so that it respectively calculates a value of active power and a value of reactive power of the AC power output by the power conditioner 2 to the power system based on the time information of the zero crossing point of the system voltage and the system current of each phase of the power system provided from the FPGA circuit 14 so that the values of the electrical energy of the active power and the reactive power of the AC power output by the power conditioner 2 to the power system respectively become the calculated values, the present invention is not limited thereto, and various other arithmetic circuits other than the CPU 15 may also be broadly applied.

INDUSTRIAL APPLICABILITY

The present invention can be broadly applied to control units of various configurations for controlling a power conditioner.

REFERENCE SIGNS LIST

1 . . . power conditioner system, 2 . . . power conditioner, 3 . . . zero cross detection board, 4 . . . power device, 5 . . . panelboard, 6R, 6S, 6T . . . power line, 10R, 10S, 10T . . . pulse transformer, 11R, 11S, 11T . . . difference amplifier, 12RA, 12SA, 12TA . . . current comparator, 12RV, 12SV, 12TV . . . voltage comparator, 13RA, 13SA, 13TA . . . current operational amplifier, 13RV, 13SV, 13TV . . . voltage operational amplifier, 14 . . . FPGA circuit, 14A . . . counter circuit, 15 . . . CPU.

The invention claimed is:

1. A control unit which controls a power conditioner that converts DC power into AC power and outputs the AC power to a system, comprising:
   a step-down unit which causes a system voltage of each phase of the system to step down;
   a voltage pulse signal generation unit which generates a voltage pulse signal as a pulse signal of the system voltage of each of the phases that was stepped down by the step-down unit;
   a current pulse signal generation unit which generates a current pulse signal as a pulse signal of a system current of each of the phases of the system;
   a zero crossing point detection unit which outputs time information of a zero crossing point of the system voltage and the system current of each of the phases based on the voltage pulse signal and the current pulse signal of each of the phases of the system; and
   an arithmetic unit which calculates, respectively, a value of active power and a value of reactive power of the AC power output by the power conditioner to the system based on the time information of the zero crossing point of the system voltage and the system current of each of the phases of the system provided from the zero crossing point detection unit, and controls the power conditioner so that a value of the active power and a value of the reactive power of the AC power output by the power conditioner to the system respectively become the calculated values.

2. The control unit according to claim 1,
   wherein the arithmetic unit:
   calculates, respectively, a value of active power and a value of reactive power of the AC power to be output by the power conditioner to each of the phases of the system based on the voltage pulse signal and the current pulse signal of each of the phases of the system provided from the zero crossing point detection unit, and apparent power of the AC power calculated based on a power factor of the AC power output from the power conditioner prescribed in advance in a grid interconnection code; and
   sends, to the power conditioner, the calculated value of the active power and the calculated value of the reactive power as a target value of the active power and a target value of the reactive power of the AC power, respectively.

3. The control unit according to claim 2,
   wherein the arithmetic unit:
   measures, respectively, the system voltage and the AC power of the system, and, when the value of the active power and the value of the reactive power of the AC power to be output from the power conditioner are not the target values provided to the power conditioner, and the value of the active power and the value of the reactive power are within a standard range, sends, to the power condition, the calculated value of the active power and the calculated value of the reactive power as a target value of the active power and a target value of the reactive power of the AC power, respectively.

4. The control unit according to claim 3,
   wherein the arithmetic unit:
   measures, respectively, the system voltage and the AC power of the system, and, when the value of the active power and the value of the reactive power of the AC power to be output from the power conditioner are not the target values provided to the power conditioner, and the value of the active power and the value of the reactive power are within a standard range, causes the power conditioner to stop its operation.

\* \* \* \* \*